Dec. 18, 1951     S. W. NEWELL     2,579,155
UNITARY STARTING AND DYNAMIC BRAKING SYSTEM FOR
INTERNAL-COMBUSTION ENGINES
Filed May 22, 1946     3 Sheets-Sheet 3

INVENTOR.
Sidney W. Newell
BY
*Stephen S. Townsend*
Attorney

Patented Dec. 18, 1951

2,579,155

UNITED STATES PATENT OFFICE 2,579,155

UNITARY STARTING AND DYNAMIC BRAKING SYSTEM FOR INTERNAL-COMBUSTION ENGINES

Sidney W. Newell, Danville, Calif., assignor to The Union Diesel Engine Company, Oakland, Calif., a corporation of California Application May 22, 1946, Serial No. 671,603

11 Claims. (Cl. 60—16)

The present invention relates to dynamic braking systems for internal combustion engines and more particularly to pneumatic braking systems for Diesel engines, or the like.

In a Diesel engine mounted aboard a ship, it is frequently desirable, when the ship is moving either in the ahead direction or in the astern direction, to stop the engine and the ship in a minimum time or to make a so-called "crash" stop. This is usually accomplished by applying a mechanical friction brake to the engine and connected propeller shaft in order to stop the engine and cause the propeller to drag the water in order to brake the motion of the ship. While this arrangement is reasonably satisfactory, a great amount of heat is developed in the mechanical friction brake due to the inertia of both the engine and the ship, rendering necessary complicated friction brake cooling facilities.

Accordingly, it is an object of the present invention to provide an improved dynamic braking system for a Diesel engine, or the like, mounted aboard a ship or other vessel to be propelled thereby.

Another object of the invention is to provide an improved unitary starting and dynamic braking system for a Diesel engine, or the like. A further object of the invention is to provide a unitary pneumatic starting and braking system for a Diesel engine or the like.

The invention, both as to its organization and method of operation, together with further objects and advantages thereof, will best be understood by reference to the following specification taken in connection with the accompanying drawings in which similar characters of reference represent corresponding parts:

Figures 1, 3:
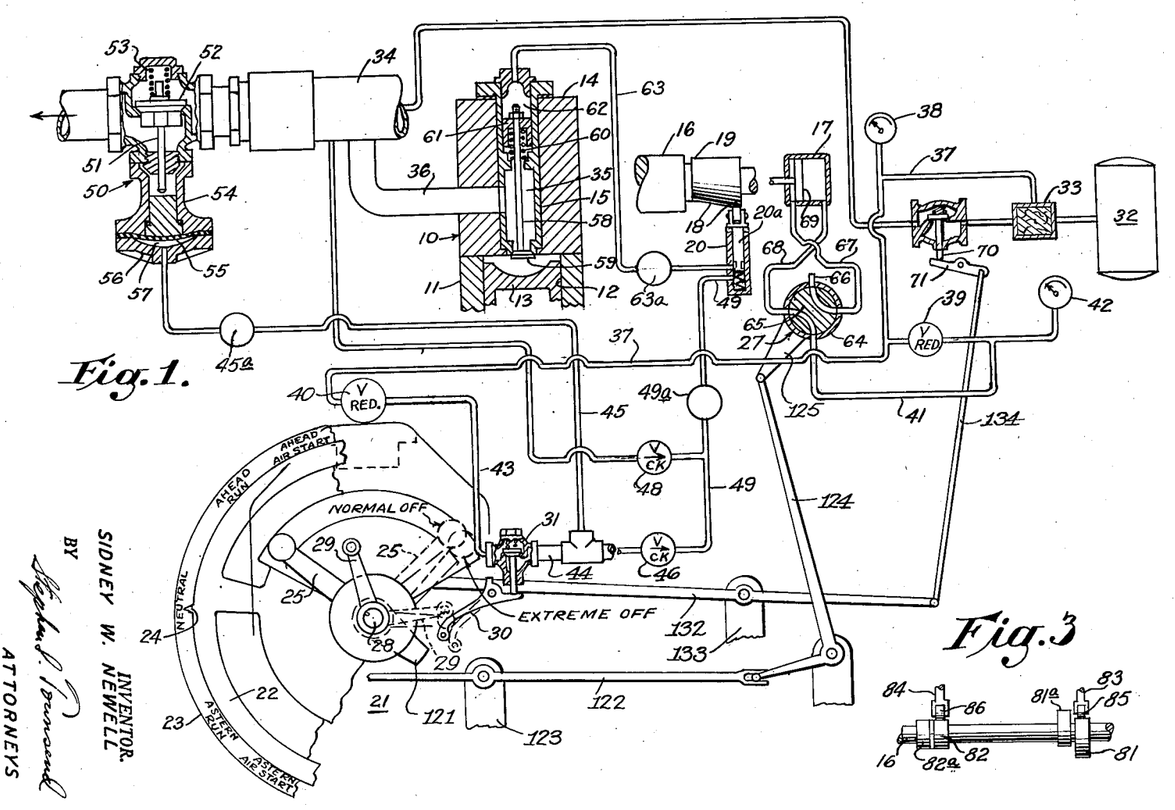
Figure 1 is a diagrammatic illustration, partly in section, of a Diesel engine and associated pneumatic starting and braking system and embodying the present invention.
Fig. 3 is a view in side elevation of a portion of the cam shaft.

Referring now to Figure 1, there is illustrated an internal combustion engine cylinder 10, of substantially conventional Diesel type and provided with a block 11, or comprising a plurality of blocks, and having a plurality of cylinders formed therein, such as indicated at 12, 12a, 12b, 12c, 12d, and 12e; each cylinder slidably receiving a piston connected through the usual expediency of a connecting rod to a common rotatably mounted crank shaft, not shown. Specifically, in the block 11 one of the cylinders 12 is illustrated slidably supporting a piston 13. Also, the block 11 supports a head 14 closing the upper ends of each of the cylinders, and carrying fuel injector apparatus, to be described in more detail hereinafter, as well as a plurality of starting air valves such as indicated at 15, 15a, 15b, 15c, 15d, and 15e respectively associated with the cylinders; the starting air valve 15 being individually associated with the cylinder 12.

Associated with the crank shaft of the Diesel engine 10 is a cam shaft 16 mounted for both rotation by the crank shaft and longitudinal sliding movement by an associated cam shaft shift mechanism 17. The cam shaft 16 carries an ahead cam 18 and an astern cam 19 forming a part of the starting and the braking timing system of the engine 10 and both adapted to cooperate with a plurality of starting air relay valves respectively associated with the corresponding starting air valves. More specifically, the starting air relay valve 20 illustrated is individually associated with the starting air valve 15, which, in turn, is individually associated with the cylinder 12 in the block 11 of the engine 10. It will be understood that in the position of the cam shaft 16 illustrated, the ahead cam 18 is operatively associated with the starting air relay valves 20; and that when the cam shaft 16 is shifted to the right, the astern cam 19 is operatively associated with the starting air relay valves 20.

Also, the engine 10 comprises a control station 21, provided with a hand wheel 22 mounted for partial rotation from a neutral position to two positions clockwise and from the neutral position to two positions counterclockwise. Specifically, the hand wheel 22 may be shifted clockwise from the neutral position first to an "ahead run" position and then to an "ahead air start" position; and the hand wheel 22 may be shifted counterclockwise from the neutral position first to an "astern run" position and then to an "astern air start" position. More particularly, an indicia plate 23 is operatively associated with a pointer 24 carried by the hand wheel 22, which indicia plate 23 carries the legends "Neutral," "Ahead run," "Ahead air start," "Astern run" and "Astern air start." Also, the control station 21 is provided with a fuel throttle 25 having a "normal off" position illustrated, an "extreme off" position clockwise of the "normal off" position as well as adjustable "fuel feed" positions counterclockwise of the "normal off" position.

The hand wheel 22 is operatively connected to a start air manifold valve 26 and to a cam shaft shift valve 27 which are utilized for purposes more fully explained hereinafter, while the fuel throttle 25 is mounted upon a shaft 28 which carries a lever 29 that is adapted operatively to engage a pivotally mounted arm 30 associated with a pilot valve 31, which pilot valve is employed for a purpose more fully explained hereinafter. In passing, it is noted that when the fuel throttle 25 is moved from its normal off position to its extreme off position, the shaft 28 is rotated to the right in order to cause the lever 29 to engage the pivotally mounted arm 30 in order to open the pilot valve 31, as explained in greater detail hereinafter.

Figure 4:
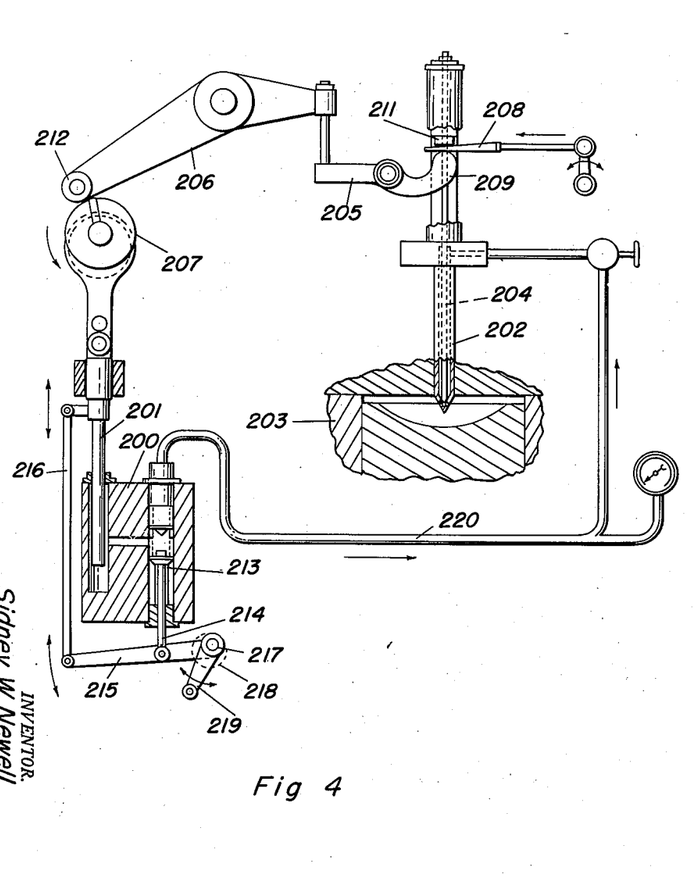
Fig. 4 is a schematic view of a preferred fuel injection system.
Figure 5:
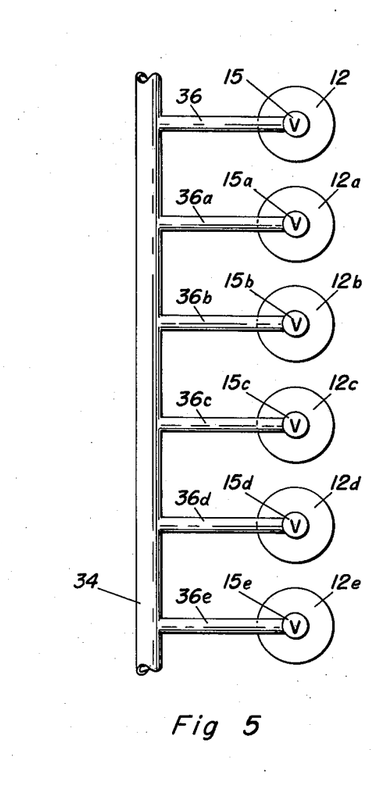
Fig. 5 is a schematic view of a plurality of cylinders and individually associated air starting valves connected to the air manifold.

Although any one of several types of conventional fuel injection mechanisms may be employed in association with the present invention to supply fuel to the engine, the fuel system shown and described in U. S. Patent No. 1,747,578, D. Davison et al., dated February 18, 1930, has been found to be particularly satisfactory. Fig. 4 illustrates more or less schematically the fuel injection mechanism generally similar to the said Davison patented device and is described briefly as follows:

The system is of the mechanical-injection, constant pressure type comprising a fuel pump 200 having at least one plunger 201 to maintain constant pressure of from 1,000 to 4,000 p. s. i. on the system. Fuel injection valves, such as the one indicated at 202, are mounted on the cylinder heads of the engine, as indicated at 203, to admit fuel to said cylinders. The control of admission of fuel into the cylinder is affected by lift of needle 204 in valve 202 which in turn is operated by rocker arms 205 and 206, the roller on the end of the latter being in contact with fuel cam 207. The quantity of fuel admitted to the cylinder, and the rate of fuel feed for the various conditions of lead, is determined by the period of admission, the fuel pressure, and the size of orifices in the fuel nozzle. The orifice size is necessarily fixed for any given cylinder size whereas the period of admission and the fuel pressure may be controlled manually or may be controlled by the governor. More particularly, the period of admission is varied by longitudinal movements of wedge 208 which is disposed between end 209 of rocker arm 205 and enlarged shoulder portion 211 of needle 204. Longitudinal movement of wedge 208 is preferably governor operated and will vary correspondingly the clearance between roller 212 of rocker 206 and fuel cam 207.

The fuel is controlled by varying the time of seating of the fuel pump suction valve 213. More particularly, push-rod 214 is linked by means of link arms 215 and 216 to fuel plunger 201, said linkage being adapted to impart vertical movement to push-rod 214 off of plunger 201. The pivotal fulcrum 217 of link arm 215 is eccentrically mounted by means of eccentric 218, rotation of which said eccentric is controlled through control arm 219, in turn, may be controlled manually or off of the engine governor. Movement of arm 219 will cause fulcrum 217 to move upwardly or downwardly and the vertical location of the fulcrum in turn determines the point during the pump stroke when the suction valve seats. The fuel supply conduit 220, of course, connects the fuel supply pump with the fuel injection valves.

As heretofore mentioned the above described fuel injection system is of a more or less conventional type and reference to aforementioned Patent No. 1,747,578 (Davison) may be had for a more detailed description and explanation of fuel systems of this type.

Considering now the unitary pneumatic starting and dynamic braking system associated with the engine 10 in greater detail, it is noted that this system comprises an air pressure tank 32 containing air under a pressure of about 100 to 300 pounds per per square inch and a connected air manifold strainer 33. The air manifold strainer 33 is directly connected to the starting air manifold valve 26, which in turn is directly connected to an air manifold 34, which air manifold is connected to each of the starting air valves 15, 15a, 15b, 15c, 15d, and 15e by pipes 36, 36a, 36b, 36c, 36d, and 36e, respectively. More specifically, the air manifold 34 is connected to a chamber 35 formed in the starting air valve 15 by an air pipe 36. Also, the air manifold strainer 33 is directly connected to an air pipe 37 provided with a pressure gauge 38, which air pipe 37 is connected to two pressure reducing valves 39 and 40. The pressure reducing valve 39 is connected to an air pipe 41 provided with a pressure gauge 42, which air pipe 41 is connected into the casing of the cam shaft shift valve 27, for a purpose more fully explained hereinafter. The pressure reducing valve 40 is connected by an air pipe 43 to the pilot valve 31, which pilot valve 31 is connected to an air pipe 44 which in turn is connected to an air pipe 45 and to a check valve 46.

Also, the air manifold 34 is directly connected by an air pipe 47 to a check valve 48 which in turn is connected to an air pipe 49, one end of the air pipe 49 being connected to the check valve 46 and the other end of the air pipe 49 being connected to the casing of the various starting air relay valves but only one of which is shown in the drawings as at 20 for purposes of illustration.

The outer end of the air manifold 34 is directly connected to a venting valve 50 adapted to open to the atmosphere, which venting valve 50 comprises a valve stem 51, carying a valve element 52 normally urged by a spring 53 into a seated position. Also, the venting valve 50 comprises a casing 54 supporting a plunger 20a which is adapted to engage the outer end of the valve stem 51 in order to unseat the valve element 52 against the bias of the spring 53. The outer end of the casing 54 carries a resilient diaphragm 55 which in turn cooperates with a removable head 56 in order to provide a chamber 57 therebetween, which chamber 57 is directly connected to the air pipe 45 for a purpose more fully explained hereinafter.

The starting air valve 15 comprises a valve stem 58 carrying a valve element 59 normally urged to a seated position by a spring 60 and adapted to be opened against the bias of the spring 60 in order to afford a communication between the chamber 35 and the upper portion or head of the cylinder 12. Also, the valve stem 58 supports a piston 61 arranged in a cooperating casing defining a chamber 62, which chamber 62 is directly connected by an air pipe 63 to the casing of the starting air relay valve 20.

The cam shaft shift valve 27 comprises a casing 64 rotatably supporting a plug 65 and provided with a plurality of ports. More specifically, the casing 64 of the cam shaft shift valve 27 is provided with four ports, as indicated at 27a, 27b, 27c and 27d. Port 27a is directly connected to the air pipe 41, as previously noted, and port 27b is connected to a vent pipe 66. The other two ports 27c and 27d of the casing 64 of the cam shaft shift valve 27 are connected respectively to two air pipes 67 and 68, which, in turn, are directly connected to a left-hand chamber and to a right-hand chamber formed in a casing of the cam shaft shift mechanism 17, which casing slidably supports a piston 69 operatively connected to the cam shaft 16 for the purpose of shifting the cam shaft 16 in a longitudinal direction, in a manner more fully explained hereinafter.

Preferably, the starting air manifold valve 26 is of substantially conventional construction and is provided with a valve stem 70 carrying a valve element, which is normally seated. The valve stem 70 cooperates with a rock lever 71. As previously explained, the rock lever 71, associated with the valve stem 70 of the starting air manifold valve 26, as well as the plug 65 of the cam shaft shift valve 27 are operatively associated with the hand wheel 22 by a suitable cam and link mechanism described more specifically hereinafter so as to be operable in response to movement of the hand wheel 22 in a manner more fully explained hereinafter.

Preferably, the reducing valves 39 and 40, as well as the check valves 46 and 48, the air manifold strainer 33, the pilot valve 31, the cam shaft shift valve 27, the cam shaft shift mechanism 17 and the air pressure tank 32 are all of substantially conventional construction and arrangement.

Considering now the operation of the engine 10 and assuming that the engine is at rest and that it is desired to start the engine in the ahead run direction, the hand wheel 22 at the control station 21 is rotated from its neutral position clockwise to the ahead run position. When the hand wheel 22 is rotated clockwise to the ahead run position, the cam shaft shift valve 27 is operated through a suitable linkage described hereinafter in more detail. More particularly, the plug 65 of the cam shaft shift valve 27 is operated within the casing 64 to the position illustrated, whereby the air pipe 41 is connected, through the passageway formed in the plug 65, to the air pipe 68 and the air pipe 67 is connected, through the passageway formed in the plug 65, to the vent pipe 66. At this time, air under pressure in the air pressure tank 32 is supplied through the air manifold strainer 33, the air pipe 37 and the reducing valve 39 to the air pipe 41, and thence through the cam shaft shift valve 27 into the air pipe 68 and the right-hand chamber formed in the casing of the cam shaft shift valve mechanism 17, while the left-hand chamber, formed in the casing of the cam shaft shift valve mechanism 17, is connected, via the air pipe 67 and the cam shaft shift valve 27, to the vent pipe 66. Accordingly, the piston 69 is moved to the left in the casing of the cam shaft shift valve mechanism 17, in the event it does not already occupy this position, whereby the cam shaft 16 is moved to the position illustrated in order to cause the cam 18 carried thereby to cooperate with the plungers of the various air start relay valves 20. At this time the timing mechanism of the starting and braking system, including the cam 18 and the various relay valves 20, is set for ahead start of the engine 10.

The hand wheel 22 at the control station 21 is then moved further clockwise from the ahead run position to the ahead air start position, whereby the rock lever 71 is operated through a suitable link mechanism described hereinafter in greater detail, in order to engage the valve stem 70 of the start air manifold valve 26, whereby the associated valve element is unseated, causing the air manifold strainer 33 to be connected directly to the air manifold 34. At this time, air from the air pressure tank 32 passes via the air manifold strainer 33 and the start air manifold valve 26 into the air manifold 34 and thence through the air pipes 36, into the chambers 35 of the various starting air valves 15. At this time the venting valve 50 occupies its closed position due to the engagement of the valve element 52 with its associated seat, thereby to prevent the escape of high pressure air in the air manifold 34 to the atmosphere.

Air, under high pressure, in the air manifold 34 enters the air pipe 47 and unseats the check valve 48, causing air to be supplied to the air pipe 49. One end of the air pipe 49 is closed by a check valve 46 at this time and the other end thereof communicates with the casings of the various starting air relay valves 20. More particularly, at this time one of the starting air valves, such as valve 15a, is opened in order to cause high pressure air to be admitted from the air manifold 34 into the upper end of the cylinder, whereby the crank shaft is rotated, causing rotation of the cam shaft 16. During rotation of the cam shaft 16 and in a predetermined position thereof, the cam 18 permits the plunger of the starting air relay valve 20 to rise, thereby opening the air pipe 49 into communication with the air pipe 63, whereby air, under high pressure, is supplied into the chamber 62 of the casing of the starting air valve 15. Air under high pressure in the chamber 62 moves the piston 61 fully downwardly against the bias of the spring 60, whereby the valve stem 58 moves the valve element 59 completely away from its associated seat connecting the upper portion or head of the cylinder 12 to the air pipe 36, which in turn is directly connected to the air manifold 34. Accordingly, at this time air from the air manifold 34 passes through the pipe 36 into the chamber 35 formed in the casing of the starting air valve 15 and thence past the valve element 59 freely into the upper portion or head of the cylinder 15, whereby the piston 13 is driven downwardly in order to continue rotation of the crank shaft.

After the hand wheel 22 is rotated to the ahead air start position in order to effect rotation of the crank shaft of the engine 10, in the manner explained above, the fuel throttle 25 is moved from its normal off position toward the left to one of its fuel feed positions, whereby the conventional fuel injector system hereinabove described, associated with the engine 10, is rendered operative in order to cause the engine to start running as an internal combustion engine. It is to be understood that the starting operation of the engine is similar to that normally employed in air starting Diesel motors, namely, the high pressure air is used first to rotate the crank shaft and then the fuel mixture is injected. At this time the hand wheel 22 at the control station 21 is returned counterclockwise from the ahead air start position to the ahead run position in order to cause the rock lever 71 to be operated, thereby to permit closing of the starting air manifold valve 26. When the starting air manifold valve 26 is thus closed, the supply of high pressure air from the air manifold strainer 33 to the air manifold 34 is cut off, whereby no further air is supplied through the various starting air valves 15, to the cylinders 12, of the engine 10. Also, at this time, due to the lack of high pressure air in the air manifold 34, the check valve 48 is moved to its checked or closed position, thereby to disconnect the air pipe 47 from the air pipe 49, whereby operation of the air starting relay valve 20 is without effect during normal running of the engine 10.

More specifically, due to the loss of high pressure air in the air pipe 49, air is disconnected from the air pipe 63 and the pressure is relieved (through a conventional bleed valve 63a provided in line 63) in the chamber 62 of the starting air valve 15, whereby the spring 60 moves the piston 61 in the upward direction, causing the valve element 59 to seat and thereby to cut off the communication between the upper portion or head of the cylinder 12 and the chamber 35 formed in the starting air valve 15. At this time the engine 10 is in normal running condition in the ahead direction.

Now, assume that it is desirable to stop the engine 10 and the connected ship in the shortest possible time, or, in other words, that a crash stop is to be made. In order to bring about this result, dynamic braking of the engine 10 is effected and is initiated, first, by returning the fuel throttle 25 from one of its adjusted fuel feed positions back to its normal off position and thence further clockwise into its extreme off position. When the fuel throttle 25 is thus actuated, the shaft 28 is rotated in a clockwise direction in order to cause the lever 29 to engage the pivotally mounted lever 30, whereby the pilot valve 31 is operated to its open position. At this time, air under pressure from the air pressure tank 32 is supplied via the air manifold strainer 33, the air pipe 37, and the pressure reducing valve 40 into the air pipe 43, which air, under reduced pressure, is supplied via the open pilot valve 31 into the air pipe 44 and therefrom into the air pipe 45 and into the casing of the check valve 46. The air supplied to the air pipe 45 enters the chamber 57 formed in the casing 54 of the venting valve 50 in order to effect operation of the diaphragm 55 and movement of the associated plunger in the upward direction, whereby the valve stem 51 is moved upwardly, causing the valve element 52 to unseat, whereby the air manifold 34 is connected via the venting valve 50 to the atmosphere.

The air under reduced pressure supplied into the check valve 46 causes the valve element of the check valve 46 to unseat, whereby air is supplied into the air pipe 49 both to the check valve 48 and to the casing of the starting air relay valve 20. At this time the check valve 48 operates to check or to close, thereby to insure that the air pipe 49 is not connected to the air pipe 47 since the air pipe 47 is connected directly to the air manifold 34 which at this time is vented to the atmosphere by virtue of the open position of the venting valve 50.

At this time, the hand wheel 22 at the control station 21 is operated from the ahead run position through the neutral position into the astern run position, whereby the cam shaft shift valve 27 is operated in order to connect the air pipe 68 to the vent pipe 66 and to connect the air pipe 41 to the air pipe 67 by virtue of the rotation of the plug 65 in an obvious manner. At this time air under pressure from the air pressure tank 32 is supplied via the air manifold strainer 33, the air pipe 37, the pressure reducing valve 39, the air pipe 41, and the passageway in the plug 65 of the cam shaft shift valve 27 to the air pipe 67 and thence into the left-hand chamber of the casing of the cam shaft shift mechanism 17, while the right-hand chamber, formed in the casing of the cam shaft shift mechanism 17, is connected via the air pipe 68 and the passage formed in the plug 65 of the cam shaft shift valve 27 to the venting pipe 66. Accordingly, the piston 69 of the cam shaft shift valve mechanism 17 is moved from its ahead run position illustrated to the right and into the astern run position, whereby the cam 18 disengages the plunger of the starting air relay valve 20 and the cam 19 engages this plunger. Of course, the cam 19 cooperates with the plungers of the other starting air relay valves in a similar manner.

At this time the ship is moving in the ahead direction and the crank shaft of the engine 10 is running in the ahead direction, whereby the associated crank shaft effects rotation of the cam shaft 16, causing the cam 19 selectively and sequentially to operate the plungers of the starting air relay valves 20. During rotation of the cam shaft 16, the cam 19, during a predetermined position thereof, permits the plunger of the starting air relay valve 20 to be raised, whereby the air pipe 49 is connected to the air pipe 63, permitting air under reduced pressure to be introduced in the chamber 62 formed in the casing of the starting air valve 15; the air in the air pipe 49 having been communicated thereinto through the reducing valve 40 and the pilot valve 31 which occupies its open position. The air under reduced pressure introduced into the chamber 62 is nevertheless under sufficient pressure to move the piston 61 partially downwardly against the bias of the spring 60, whereby the valve stem 58, moving in the downward direction, causes the valve element 59 to be unseated slightly effecting restricted communication between the upper portion or head of the cylinder 12 and the air pipe 36 at this time. The air pipe 36 is directly connected to the air manifold 34 and consequently to the atmosphere by virtue of the fact that the venting valve 50 is open during the braking operation.

Subsequently, as the cam shaft 16 is rotated, the cam 19 effects operation of the plunger of the starting air relay valve 20 in the downward direction, whereby the air pipe 49 is disconnected from the air pipe 63, causing the supply of air, under reduced pressure, to be cut off from the chamber 62 formed in the casing of the starting air valve 15, whereby the spring 60 forces the valve stem 58 upwardly, causing the valve element 59 to seat and thereby completely disconnecting the upper portion or head of the cylinder 12 from the air pipe 36 and the air manifold 34 and consequently from atmosphere by virtue of the fact that the venting valve occupies its open position during braking.

More particularly, at this time the cam shaft 16 occupies its position toward the right which is the astern run position and cooperating with the starting air relay valves 20 constitutes timing mechanism for starting and braking system of the engine 10, which arrangement is so coordinated that the starting air relay valve 20 controls the starting air valve 15 in a coordinated manner with respect to the movement of the piston 13 in the cylinder 12 as determined by the rotation of the associated crank shaft of the engine 10. More specifically, the elements mentioned are so coordinated that the starting air relay valve 20 causes the starting air valve 15 to close completely just before the piston 13 reaches the extreme upper end of its up stroke, whereby shortly thereafter, when the piston 13 begins to travel in its down stroke, the upper portion or head of the cylinder 12 is disconnected from the chamber 35 formed in the casing of the starting air valve 15 by virtue of the seated position of the valve element 59. Accordingly, as the piston 13 travels downwardly in its down stroke, a vacuum is formed in the upper portion or head of the cylinder 12, dissipating some kinetic energy of the engine and the connected system, including the ship, by virtue of the work performed as a consequence of the vacuum formed in the upper portion or head of the cylinder 12.

Just before the piston 13 reaches the extreme lower position in its down stroke, the cam 19 governs the starting air relay valve 20, in the manner previously explained, in order to cause the air pipe 49 to be connected to the air pipe 63, whereby the starting air valve 15 is controlled in order to cause the valve element 59 to be unseated slightly. At this time air in the air manifold 34 passes through the air pipe 36 into the chamber 35 formed in the casing of the starting air valve 15 and thence around the valve element 59 in its slightly unseated position into the upper portion or head of the cylinder 12, relieving the vacuum condition therein.

Shortly thereafter, when the piston 13 begins to move upwardly in its up stroke, the air in the upper portion or head of the cylinder 12 is compressed somewhat, creating a pressure therein which is exerted upon the lower portion of the valve element 59. In this connection it is noted that the diameter of piston 61 is larger than the diameter of valve element 59 and that therefore the reduced pressure acting upon the larger piston is sufficient to prevent the compressed air in the cylinder from fully closing the valve element as will be more fully explained hereinafter. As the piston 13 continues to move upwardly in its up stroke, the air in the upper portion or head of the cylinder 12 is further compressed, whereby additional pressure is exerted upon the valve element 59. The pressure in the upper portion or head of the cylinder 12 as exerted upon the valve element 59 tends to move the valve stem 58 upwardly against the force exerted upon the piston 61 by virtue of the air under reduced pressure in the chamber 62 formed in the casing of the starting air valve 15. Accordingly, during the up stroke of the piston 13, the valve element 59 is moved upwardly somewhat against the force exerted upon the piston 61 by virtue of the air under reduced pressure in the chamber 62 formed in the casing of the starting air valve 15, whereby the valve element 59 is moved toward its corresponding valve seat but not into a firmly seated condition.

More specifically, the valve element 59 is moved closely adjacent to its valve seat as a consequence of its balance between the forces acting both upwardly and downwardly upon the valve stem 58, whereby the valve element 59 occupies what may be termed a "cracked" position, whereby the air under pressure in the upper portion or head of the cylinder 12 is throttled past the valve element 59 and its corresponding seat into the chamber 35 formed in the casing of the starting air valve 15 and thence vented through the air pipe 36 and the connected air manifold 34 to atmosphere by virtue of the fact that the venting valve 50 occupies its open position at this time.

Balancing of the opposed forces acting upon valve 58 during upward movement of the piston as aforesaid whereby said valve element is maintained partially opened or "cracked" and not fully closed, avoids establishment of cylinder conditions under which successive adiabatic compression and expansion of the air in the cylinder would occur with resultant loss of braking action. In short, in order to maintain effective braking action, it is essential to dissipate at least most of the air in the cylinder compressed by upward movement of the piston prior to the return downward stroke of the piston. This end is accomplished in the present system by throttling the air under compression through "cracked" valve element 59 during upward movement of the piston. The "cracked" valve element does not establish a large enough vent opening for the air in the cylinder to escape therefrom in proportion to the rate of volume displacement of the upwardly moving piston and, therefore, the air is compressed during upward movement of said piston, and prior to its venting, which, in turn, effects a braking action on said piston.

The compression of the air in the upper portion or head of the cylinder 12 during the up stroke of the piston 13 and the throttling of this compressed air through the chamber 35 formed in the casing of the starting air valve 15 and thence through the air pipe 36, the air manifold 34 and the venting valve 50 to atmosphere dissipates kinetic energy of the engine 10 and the connected system, including the ship, by virtue of the work performed as a consequence of the compression of the air in the upper portion or head of the cylinder 12.

Just before the piston 13 reaches the extreme upper end of its up stroke, the cam 19 controls the starting air relay valve 20 in order to disconnect the air pipe 49 from the air pipe 63, whereby the supply of air, under reduced pressure, to the chamber 62 formed in the casing of the starting air valve 15 is relieved. At this time the spring 60 forces the valve stem 58 upwardly, whereby the valve element 59 again seats, thereby completely closing the communication between the upper portion or head of the cylinder 12 and the air manifold 34. At this time a cycle has been completed and shortly thereafter a vacuum is again formed in the upper portion or head of the cylinder 12 when the piston 13 begins its down stroke.

In view of the foregoing description, it will be understood that the piston 13 alternately forms a vacuum and compresses air in the upper portion or head of the cylinder 12, thereby effecting dynamic braking of the engine and the moving connected system, including the ship, and that the other pistons of the engine 10 effect dynamic braking in a similar manner through selective control of the associated starting air relay valves cooperating with the cam 19 carried by the cam shaft 16 at this time.

After the dynamic braking of the engine and the connected moving system has been accomplished in the manner described above, the fuel throttle 25 is returned from its extreme off position toward the left to its normal off position, whereby the shaft 28 is rotated in a counterclockwise direction, causing the lever 29 to disengage the pivotally mounted lever 30 and permitting the pilot valve 31 again to be closed. When the pilot valve 31 is again closed, the supply of air under reduced pressure in the air pipe 43 is disconnected from the air pipe 44, whereby the supply of air under reduced pressure is removed through a conventional and suitable bleed valve 45a from the air pipe 45 and the check valve 46 again closes.

When air under pressure is removed from the air pipe 45, the air pressure in the chamber 57, formed between the head 56 and the diaphragm 55 in the casing 54 of the venting valve 50, is relieved, whereby the spring 53 forces the valve element 52 into its seated position in order to disconnect the air manifold 34 from atmosphere.

At this time further operation of the cam 19 with respect to the starting air relay valve 20 is without effect by virtue of the fact that the supply of air to the air pipe 49 has been cut off incident to closing of the check valve 46.

At this time the hand wheel 22 at the control station 21 is moved from the astern run position to the astern air start position, thereby effecting operation (through a suitable link mechanism hereinafter described) of the starting air manifold valve 26, whereby the engine 10 is started in the astern direction in a manner substantially identical to that previously explained when the fuel throttle 25 is moved from its normal off position toward the left to an adjusted one of its fuel feed positions.

At this time the engine continues to run in the astern direction and dynamic braking thereof in the astern direction may be effected in a manner substantially identical to that described above. More particularly, in order to effect dynamic braking of the engine 10 in the astern direction, the fuel throttle 25 is returned from one of its adjusted fuel feed positions to the right, first to its normal off position and thence into its extreme off position in order to effect operation of the venting valve 50 in the manner previously explained. The hand wheel 22 at the control station 21 is then moved from its astern run position through its neutral position to its ahead run position, thereby effecting operation of the cam shaft shift valve 27.

At this time dynamic braking of the engine and the connected moving system, including the ship, is brought about in a manner substantially identical to that previously explained. Thereafter, the engine 10 may be started in the ahead direction by moving the hand wheel 22 at the control station 21 into the ahead air start position, all as previously described.

Figure 2:
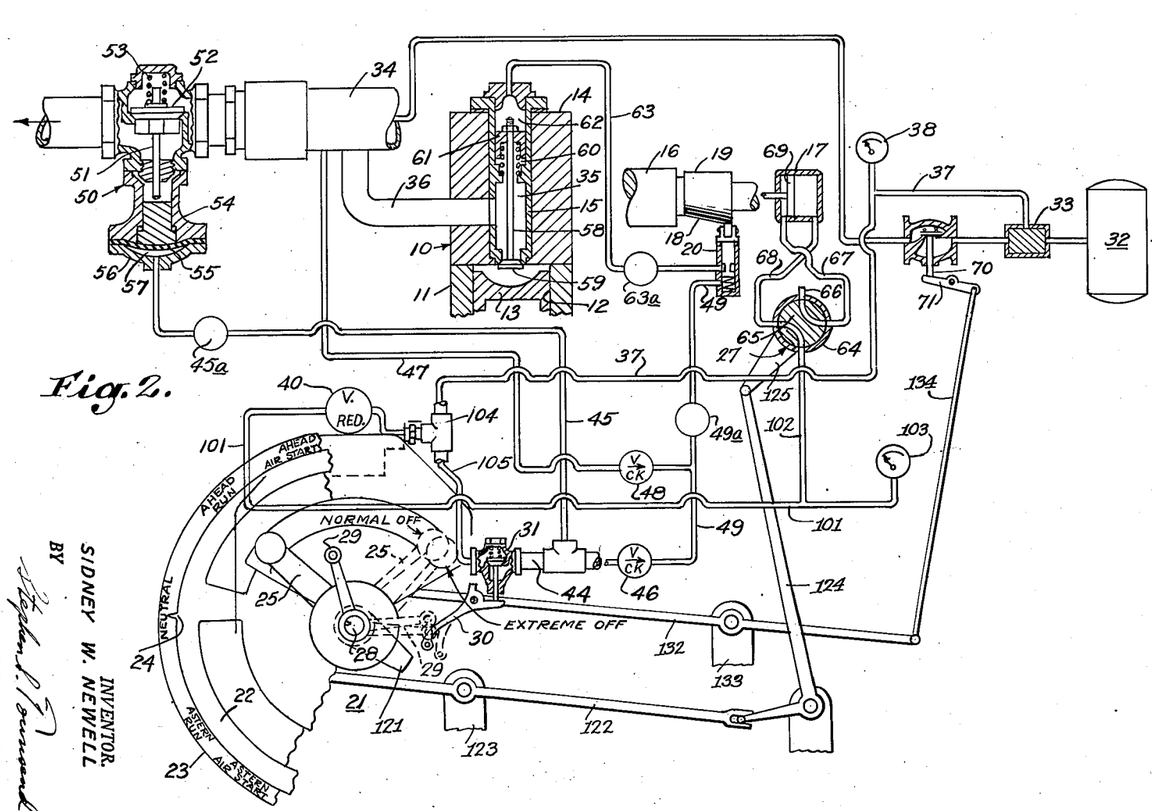
Figure 2 is a diagrammatic illustration of a modification thereof.

Referring now to the modification of Figure 2, there is illustrated a system of dynamic braking similar to that above described except that air under high pressure, rather than reduced pressure, is utilized to actuate the valve 15 during the braking operation, and air under high pressure is used to actuate venting valve 50. Thus reducing valve 39 is eliminated in the modified structure.

There is provided an air pipe 101 connected to the air pressure reducing valve 40 and which is operatively connected to a line 102, which in turn is connected to cam shaft shift valve 27 in the same manner and operative in the same fashion as line 41 of Fig. 1. A pressure gauge 103 is preferably connected to line 101.

Air under high pressure is fed from source 32, through line 37, to T 104, connected to pressure reducing valve 40. Air line 105 connects T 104 to pilot valve 31, which is operated in the same manner as above described with reference to Figure 1. It is noted that high pressure air passes through line 37, T 104, line 105, and, when actuated, through pilot valve 31 and associated lines 45, and 49 to venting valve 50, and relay valve 20, respectively.

Part of the air under high pressure from line 37 passes through the head of T 104 to line 105, pilot valve 31 and associated parts and part of the high pressure air passes through the stem of T 104 to pressure reducing valve 40 to line 101 and associated parts. Thus, there is a constantly maintained reduced air pressure in line 101 which is in turn connected to valve 27. Again, there is constantly maintained high pressure air in line 105 connected to pilot valve 31.

The operation of the modified starting and braking system illustrated in Figure 2 is substantially identical to that described above with reference to the system illustrated in Figure 1.

The principal difference in function between the two systems illustrated is that air under high pressure is utilized to actuate the valve element 59 of starting air valve 15 during braking in the modified system. Hence, air under high pressure passes through pilot valve 31, upon opening thereof, by movement of fuel lever 25 clockwise from "normal off" to "extreme off" position, as previously described, and communicates with venting valve 50, through line 45, and opens said valve to the atmosphere. Simultaneously air under high pressure communicates with relay valve 20, through line 44, check valve 46, and line 49 and from relay valve 20, through line 63 to chamber 62 to depress stem 58 and connected valve element 59 to open communication to the cylinder 12.

The means for operating the cam shift valve 27 upon rotation of the hand wheel 22 comprises conventional linkage and is the same in both mechanisms herein set forth, namely, the systems of Fig. 1 and Fig. 2. A cam 121 is keyed to the hand wheel shaft (not shown), and, upon rotation of the hand wheel, contacts a cam lever 122 pivotally fulcrumed to a support 123 and is pivotally connected to a bell crank 124 and is also pivotally connected to a valve arm 125, which said valve arm is appropriately connected to the cam shift valve 27. When the hand wheel is rotated the valve is actuated through the linkage, hereinbefore mentioned, in order to rotate the plug 65 within the casing 64, all as hereinbefore set forth.

Similarly, the cam 121 contacts a cam lever 132 pivotally fulcrumed as at 133 and which is connected with lever 134 attached to rock lever 71 which cooperates with valve stem 70 of air manifold valve 26. Upon rotation of the hand wheel 22 the cam 121 contacts cam lever 132 thereby moving rock lever 71 through lever 134 to move valve stem 70 relative to the manifold valve 26. As hereinbefore set forth, the valve stem 70 carries a valve element (not shown) which is seated. Upon movement of the valve stem, communication through the air manifold valve 26 is opened or closed, as the case may be.

Movement of the hand wheel 22, as previously described, appropriately moves the cam shift valve 27, in turn connected to reduced pressure in line 102, in order to operate the cam shaft shift in the manner as previously described.

It is further noted that opening pilot valve 31 allows air under high pressure to flow through lines 44 and 45 to venting valve 50 to open the manifold 34 to atmosphere.

During braking, the valve element 59 is opened full instead of being "cracked," due to the high air pressure introduced into chamber 62 rather than under reduced pressure, as previously described. The opening and closing of element 59 takes place at the same position of the reciprocating piston 13 as has been heretofore described.

It is noted that the orifice communicating between cylinder 12 and chamber 35 of starting air valve 15 is very small. Hence when the element 59 is open on the upstroke of the piston 13, air in the cylinder (which can not escape rapidly through the small orifice) is compressed and bled past the element 59 and thence through chamber 35, line 36, manifold 34, and venting valve 50 to atmosphere.

As previously mentioned, the time of opening and closing of element 59 relative to the stroke position of piston 13 is identical with that previously described in reference to Figure 1 as governed by relay valve mechanism 20. After braking, air may be bled from the lines, through the aforementioned bleed valves 45a, 49a, and 63a.

No mention has heretofore been made as to the construction and operation of the intake and exhaust valves of the engine. The reason for this omission has been intentional as the said valves are of conventional construction and operate in a manner highly conventional in marine direct reversible type 4-cycle Diesel engines. In order to further clarify the present disclosure, however, reference is now made to Fig. 3 in the drawings which illustrates a conventional cam shaft arrangement for actuating the exhaust and intake valves.

Normally the exhaust and intake valves on a conventional engine of the type herein mentioned are normally spring biased to closed position and are opened upon depression of the valve stem. This latter movement is usually accomplished through a plurality of rocker arms mounted over the various valve stems, and the rocker arms themselves, in turn, are operated through push rods controlled off the cam shaft. The construction of conventional intake and exhaust valves together with their associated rocker arms are so well known that it is deemed unnecessary to elaborate more fully on them at this time.

Preferably, in the present system, the cams which operate the intake and exhaust valves of the engine are provided on the same cam shaft which actuates the air cylinder valves 20. To illustrate, Fig. 3 shows shaft 16 (which carries air valve actuating cams 18 and 19) as carrying cams 81 and 81a and cams 82 and 82a which are adapted to cam respectively the push rods 83 and 84 having rollers 85 and 86, respectively. Push rod 83 may be considered as operatively associated (through a suitable rocker arm) with the air intake valve (not shown) of cylinder 12, and push rod 84 may be considered as similarly operatively associated with the exhaust valve (not shown) in cylinder 12. Cams 81 and 81a are disposed normal to cams 82 and 82a. Axial movement of shaft 16 to the right or left (according to the actuation of cam shaft shift valve 27) determines, of course, on which of the cams 81 or 81a push rod roller 85 will ride and on which of the cams 82 or 82a push rod roller 86 will ride. When hand wheel 22 is moved, for example, to its "ahead run" position, shaft 16 will shift to the left and push rods 83 and 84 will operate off of cams 81 and 82 respectively to operate the intake and exhaust valves in proper sequence and phase relation to drive the engine in a forward direction. Obviously, when hand wheel 22 is moved to "astern run," shaft 16 will shift to the right and the air intake and exhaust valves will operate off of cams 81a and 82a respectively to drive the engine at a reverse speed.

It will be recalled that during dynamic braking operations, the engine is running in one direction and the hand wheel indicates the directional movement of the ship in an opposite direction. In the example given hereinabove it was assumed the engine was operating at a forward speed and the hand wheel 22 was then shifted to its "astern run" position, and thereafter, upon shifting of the fuel control arm 25, engine braking was effected through admission of compressed air into the cylinder during an upward stroke of the piston and through formation of a vacuum during a downward stroke of the piston.

Actually this braking action occurs in only two out of four piston strokes (i. e., compression and firing strokes) of each cycle because during the other two strokes (intake and exhaust) of the same cycle either the exhaust or intake valve in the cylinder is open which prevents the piston from compressing the gas in the cylinder or prevents formation of a vacuum to effect a braking action.

In passing it is to be further noted that the fuel injector mentioned hereinabove is of conventional design and is preferably operated in conventional fashion through cams which in the present system are provided on cam shaft 16. It is believed evident that for each fuel injector two cams would be provided on the cam shaft—one of the cams being provided to actuate the injector during forward driving of the engine, and the other cam arranged to actuate the injector during reverse driving of the engine in proper timed relationship with respect to the piston, and cylinder exhaust and intake valves with which said injector is associated. It is also believed manifest that conventional cylinder pressure relief valves are normally provided on each of the said cylinders 12.

In view of the foregoing, it will be understood that there has been provided a Diesel engine having an improved dynamic braking system of the pneumatic type which is positive in operation and of simple and rugged construction.

While there has been described what is at present considered to be the preferred embodiment of the invention, it will be understood that various modifications may be made therein and it is intended to cover in the appended claims all such modifications as fall within the true spirit and scope of the invention.

I claim:

1. In combination with an internal combustion engine of the reversible type including a plurality of cylinders respectively supporting a plurality of reciprocating pistons, a manifold, a plurality of valves respectively associated with said cylinders and commonly associated with said manifold, each of said valves provided with means to normally maintain them in a closed position and operative to an open position to afford communication between the associated cylinder and said manifold, direction control mechanism, and fuel supply control mechanism, braking mechanism comprising timing apparatus adapted to be set into either of two positions respectively corresponding to forward and to backward operations of said engine and adapted to be rendered operative in either setting selectively to control said valves in timed relation with respect to the movements of the associated pistons so that any given valve is closed near the beginning and opened near the end of the down stroke of the associated piston, means governed by said direction control mechanism for selectively setting the position of said timing apparatus, and means governed by said fuel supply control mechanism for selectively rendering operative said timing apparatus.

2. In combination with an internal combustion engine of the reversible type including a plurality of cylinders respectively supporting a plurality of reciprocating pistons, a manifold, a plurality of valves respectively associated with said cylinders and commonly associated with said manifold, each of said valves provided with means to normally maintain them in a closed position and operative to an open position to afford communication between the associated cylinder and said manifold, direction control mechanism, and fuel supply control mechanism, braking mechanism comprising timing apparatus adapted to be set into either of two positions respectively corresponding to forward and to backward operations of said engine and adapted to be rendered operative in either setting selectively to control said valves in timed relation with respect to the movements of the associated pistons so that any given valve is partially opened near the beginning and completely closed near the end of the up stroke of the associated piston, means governed by said direction control mechanism for selectively setting the position of said timing apparatus, and means governed by said fuel supply control mechanism for selectively rendering operative said timing apparatus.

3. In combination with an internal combustion engine of the reversible type including a plurality of cylinders respectively supporting a plurality of reciprocating pistons, a manifold, a plurality of valves respectively associated with said cylinders and commonly associated with said manifold, each of said valves provided with means to normally maintain them in a closed position and operative to an open position to afford communication between the associated cylinder and said manifold, direction control mechanism, and fuel supply control mechanism, braking mechanism comprising timing apparatus adapted to be set into either of two positions respectively corresponding to forward and to backward operations of said engine and adapted to be rendered operative in either setting selectively to control said valves in timed relation with respect to the movements of the associated pistons so that any given valve is completely closed near the beginning and completely opened near the end of the down stroke and partially opened near the beginning and completely closed near the end of the up stroke of the associated piston, means governed by said direction control mechanism for selectively setting the position of said timing apparatus, and means governed by said fuel supply control mechanism for selectively rendering operative said timing apparatus.

4. In combination with an internal combustion engine of the reversible type including a plurality of cylinders respectively supporting a plurality of reciprocating pistons, a manifold, a plurality of pneumatic valves respectively associated with said cylinders and commonly associated with said manifold, each of said pneumatic valves provided with means to normally maintain them in a closed position and operative to an open position to afford communication between the associated cylinder and said manifold, direction control mechanism, and fuel supply control mechanism, braking mechanism comprising timing apparatus adapted to be set into either of two positions respectively corresponding to forward and to backward operations of said engine, a plurality of pneumatic relays individually associated with said pneumatic valves and adapted to be rendered operative in either setting of said timing apparatus selectively to control said pneumatic valves in timed relation with respect to the movements of the associated pistons, means governed by said direction control mechanism for selectively setting the position of said timing apparatus, and means governed by said fuel supply control mechanism for selectively rendering operative said pneumatic relays.

5. In combination with an internal combustion engine including a cylinder supporting a reciprocating piston, a manifold, a cylinder valve associated with said cylinder and said manifold, said cylinder valve provided with means to bias it to a closed position and operative to an open position to afford communication between said cylinder and said manifold, a source of air under pressure, a manifold valve provided with means to normally bias it to a closed position and operative to an open position to connect said source of air under pressure to said manifold, a venting valve provided with means to normally bias it to a closed position and operative to an open position to connect said manifold to the atmosphere, starting means for operating said manifold valve to its open position and for selectively controlling the operation of said cylinder valve so that said cylinder valve is completely opened near the beginning and completely closed near the end of the down stroke of said piston, and braking means for operating said venting valve to its open position and for selectively controlling the operation of said cylinder valve so that said cylinder valve is closed near the beginning and opened near the end of the down stroke of said piston.

6. In combination with an internal combustion engine including a cylinder supporting a reciprocating piston, a manifold, a cylinder valve associated with said cylinder and said manifold, said cylinder valve provided with means to bias it to a closed position and operative to an open position to afford communication between said cylinder and said manifold, a source of air under pressure, a manifold valve provided with means to normally bias it to a closed position and operative to an open position to connect said source of air under pressure to said manifold, a venting valve provided with means to normally bias it to a closed position and operative to an open position to connect said manifold to the atmosphere, starting means for operating said manifold valve to its open position and for selectively controlling the operation of said cylinder valve so that said cylinder valve is completely opened near the beginning and completely closed near the end of the down stroke of said piston, and braking means for operating said venting valve to its open position and for selectively controlling the operation of said cylinder valve so that said cylinder valve is partially opened near the beginning and completely closed near the end of the up stroke of said piston.

7. In combination with an internal combustion engine including a cylinder supporting a reciprocating piston, a manifold, a cylinder valve associated with said cylinder and said manifold, said cylinder valve provided with means to bias it to a closed position and operative to an open position to afford communication between said cylinder and said manifold, a source of air under pressure, a manifold valve provided with means to normally bias it to a closed position and operative to an open position to connect said source of air under pressure to said manifold, a venting valve provided with means to normally bias it to a closed position and operative to an open position to connect said manifold to the atmosphere, starting means for operating said manifold valve to its open position and for selectively controlling the operation of said cylinder valve so that said cylinder valve is completely opened near the beginning and completely closed near the end of the down stroke of said piston, and braking means for operating said venting valve to its open position and for selectively controlling the operation of said cylinder valve so that said cylinder valve is completely closed near the beginning and completely opened near the end of the down stroke and partially opened near the beginning and completely closed near the end of the up stroke of said piston.

8. In combination with an internal combustion engine including a cylinder supporting a reciprocating piston, a manifold, a pneumatic cylinder valve associated with said cylinder and said manifold, said pneumatic cylinder valve provided with means to bias it to a closed position and operative to an open position to afford communication between said cylinder and said manifold, a source of air under relatively high pressure, a manifold valve provided with means to normally bias it to a closed position and operative to an open position to connect said source of air under relatively high pressure to said manifold, a venting valve provided with means to normally bias it to a closed position and operative to an open position to connect said manifold to the atmosphere, starting means for operating said manifold valve to its open position and for selectively connecting said source of air under relatively high pressure to said pneumatic cylinder valve so that said cylinder valve is completely opened near the beginning and completely closed near the end of the down stroke of said piston, means including a reducing valve operatively connected to said source of air under relatively high pressure for producing a source of air under reduced pressure, and braking means for operating said venting valve to its open position and for selectively connecting said source of air under reduced pressure to said pneumatic cylinder valve so that said cylinder valve is partially opened near the beginning and completely closed near the end of the up stroke of said piston.

9. In combination with an internal combustion engine of the reversible type including a plurality of cylinders respectively supporting a plurality of reciprocating pistons, a manifold, a plurality of cylinder valves respectively associated with said cylinders and commonly associated with said manifold, each of said cylinder valves provided with means to bias it to a closed position and operative to an open position to afford communication between the associated cylinder and said manifold, direction control mechanism, and fuel supply control mechanism, a source of air under pressure, a manifold valve provided with means to normally bias it to a closed position and operative to an open position to connect said source of air under pressure to said manifold, a venting valve provided with means to normally bias it to a closed position and operative to an open position to connect said manifold to the atmosphere, timing apparatus adapted to be set into either of two positions respectively corresponding to forward and to backward operations of said engine and adapted to be rendered operative in either setting selectively to control said cylinder valves in timed relation with respect to the movements of the associated pistons so that said engine may be started or braked in either direction, means governed by said direction control mechanism for selectively setting the position of said timing apparatus and for operating said manifold valve to its open position and for rendering operative said timing apparatus, and means governed by said fuel supply control mechanism for operating said venting valve to its open position and for rendering operative said timing apparatus.

10. In combination with an internal combustion engine including a cylinder supporting a reciprocating piston, a manifold, a cylinder valve associated with said cylinder and said manifold, said cylinder valve provided with means to bias it to a closed position and operative to an open position to afford communication between said cylinder and said manifold, a source of air under pressure, a manifold valve provided with means to normally bias it to a closed position and operative to an open position to connect said source of air under pressure to said manifold, a venting valve provided with means to normally bias it to a closed position and operative to an open position to connect said manifold to the atmosphere, and braking means for operating said venting valve to its open position and for selectively controlling the operation of said cylinder valve so that said cylinder valve is closed near the beginning and opened near the end of the down stroke of said piston.

11. In combination with an internal combustion engine including a cylinder supporting a reciprocating piston, a manifold, a cylinder valve associated with said cylinder and said manifold, said cylinder valve being biased to a closed position and operative to an open position to afford communication between said cylinder and said manifold, a source of air under pressure, a manifold valve normally biased to a closed position and operative to an open position to connect said source of air under pressure to said manifold, a venting valve normally biased to a closed position and operative to an open position to connect said manifold to the atmosphere, braking means for operating said venting valve to its open position and for selectively controlling the operation of said cylinder valve so that said cylinder valve is closed near the beginning and opened near the end of the down stroke of said piston, said braking means comprising timing apparatus to operate said cylinder valve, and manual control means to render operative said timing apparatus.

SIDNEY W. NEWELL.

REFERENCES CITED

The following references are of record in the file of this patent:

UNITED STATES PATENTS

| Number | Name | Date |
|---|---|---|
| 885,459 | Engler et al. | Apr. 21, 1908 |
| 934,547 | Krebs | Sept. 21, 1909 |
| 1,409,625 | Vosbrink | Mar. 14, 1922 |
| 1,802,851 | Thrane | Apr. 28, 1931 |
| 1,967,538 | Romeyn | July 24, 1934 |
| 2,080,882 | Wälti | May 18, 1937 |
| 2,243,883 | Ramstad | June 3, 1941 |
| 2,269,548 | Olsson et al. | Jan. 13, 1942 |
| 2,413,390 | Stevens | Dec. 31, 1946 |

FOREIGN PATENTS

| Number | Country | Date |
|---|---|---|
| 725,223 | France | Feb. 11, 1932 |